US008077915B2

(12) United States Patent
Thorn

(10) Patent No.: US 8,077,915 B2
(45) Date of Patent: Dec. 13, 2011

(54) OBTAINING INFORMATION BY TRACKING A USER

(75) Inventor: Ola Karl Thorn, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1096 days.

(21) Appl. No.: 11/871,519

(22) Filed: Oct. 12, 2007

(65) Prior Publication Data

US 2009/0097705 A1 Apr. 16, 2009

(51) Int. Cl.
*G06K 9/00* (2006.01)
(52) U.S. Cl. ........................................ 382/103; 382/107
(58) Field of Classification Search ................ 382/103, 382/104, 107; 342/357.23, 357.31
See application file for complete search history.

(56) References Cited

U.S. PATENT DOCUMENTS

| 7,209,574 | B2 * | 4/2007 | Tafuku et al. | 382/103 |
| 7,391,887 | B2 * | 6/2008 | Durnell | 382/117 |
| 7,460,940 | B2 * | 12/2008 | Larsson et al. | 701/49 |
| 7,689,008 | B2 * | 3/2010 | Hammoud et al. | 382/117 |
| 2007/0233734 | A1 * | 10/2007 | Jendbro et al. | 707/104.1 |
| 2009/0146775 | A1 * | 6/2009 | Bonnaud et al. | 340/3.1 |

FOREIGN PATENT DOCUMENTS

WO WO 2006/110472 A2 10/2006
WO WO2006110472 * 10/2006

OTHER PUBLICATIONS

Daily, M. et al.: WebOnWorld: Geo-coded Video and Spatial Audio in Vehicles; Aerospace Conference, Mar. 3, 2007; 13 pages.
Takahashi, S. et al.: Occlusion-Free Animation of Driving Routes for Car Navigation Systems; IEEE Transactions on Visualization and Computer Graphics, vol. 12, No. 5; Sep. 2006, pp. 1141-1148.
Liang, Y. et al.: Real-Time Detection of Driver Cognitive Distraction Using Support Vector Machines; IEEE Transactions on Intelligent Transportation Systems, vol. 8, No. 2; Jun. 2007, pp. 340-350.
International Search Report and Written Opinion mailed on Aug. 20, 2008 issued for corresponding application No. PCT/IB2008/051396, 13 pages.

* cited by examiner

*Primary Examiner* — John Strege
(74) *Attorney, Agent, or Firm* — Snyder, Clark, Lesch & Chung, LLP

(57) ABSTRACT

A device may obtain tracking information of a face or a head of a user, determine a position and orientation of the user, and determine a direction of focus of the user based on the tracking information, the position, and the orientation. In addition, the device may retrieve information associated with a location at which the user focused.

20 Claims, 8 Drawing Sheets

OBTAINING INFORMATION BY TRACKING A USER

BACKGROUND

A Global Positioning System (GPS) device may use a GPS receiver and a map to locate its position. Furthermore, the GPS device may include a software application for determining a path from the current position to a destination.

SUMMARY

According to one aspect, a method may include obtaining tracking information of a face or a head of a user, determining a position and orientation of the user, and determining a direction of focus of the user based on the tracking information, the position, and the orientation. In addition, the method may retrieve information associated with a location at which the user focused.

Additionally, the method may further include presenting the retrieved information to the user via at least one of: a speaker of a headset coupled to a device; or a display of the device.

Additionally, the method may further include conducting a transaction on behalf of the user based on the retrieved information.

Additionally, conducting a transaction may include at least one of: reserving a seat in a restaurant, purchasing an item; obtaining information about businesses associated with the location; crediting or debiting an account of the user; receiving instructions for driving a vehicle toward the location; or receiving descriptions of the location.

Additionally, retrieving information may include obtaining the information from a remote database, based on information related to at least one of: an area in which the user is located; the direction of focus of the user; or the position of the user.

Additionally, determining a position and orientation may include receiving information from a global positioning system (GPS) receiver or a Beidou navigation system (BNS) receiver.

Additionally, the method may further include obtaining tracking information of an eye of the user.

Additionally, obtaining tracking information of an eye may include obtaining the tracking information of the eye based on at least one of: a reflection on a cornea of the eye; a reflection on a lens of the eye; movements of a pupil of the eye; or images of a retina inside the eye.

Additionally, determining a direction of focus may include using the tracking information of the eye and the tracking information of the face or the head to determine the direction of focus.

Additionally, retrieving information may include obtaining a list of places in an area associated with the location, obtaining, from the list, a set of places that lie in the direction of focus, and using the direction of focus and height information of each place in the set to determine a single place on which the user focused.

Additionally, obtaining tracking information of a face or a head may include capturing an image of the face or the head with a camera, matching the captured image to one of a plurality of stored images, and retrieving one or more angles that are associated with the one of the plurality of stored images.

Additionally, obtaining tracking information may include obtaining tracking information via a camera included in a device that is stably held in a vehicle in which the user is located.

Additionally, retrieving information associated with a location may include at least one of: retrieving a name of a street that is in the direction of focus of the user; retrieving a name of a landmark, a business or a building that is in the direction of focus of the user; or retrieving information associated with the landmark, the business, or the building.

According to another aspect, a device may include a processor and a camera for obtaining an image of a face or a head of a user. The processor may be configured to determine a position of the device and obtain orientation information of the face or the head by comparing the image and a plurality of images that are associated with different angles. The processor may be further configured to determine a direction at which the user is looking based on the obtained orientation information and the position of the device and obtain information associated with a location where the user is looking based on the direction and the position of the device.

Additionally, the processor may be further configured to obtain the orientation information that includes: a pitch, yaw, and roll; or Euler angles.

Additionally, the device may further include a global positioning system (GPS) receiver or a Beidou navigation system (BNS) receiver for obtaining the position and orientation of the device.

Additionally, the device of may further include a database that stores the plurality of images.

Additionally, the device may further include a speaker for presenting the obtained information associated with the location to the user.

Additionally, the device may further include a housing that shields components of the device from outside elements, where the housing is affixed to an element of a vehicle in which the user is located.

According to yet another aspect, a device may include means for obtaining tracking information of a face, a head, or eyes of a user, means for determining a location and a direction in which the user is traveling, and means for determining a direction of a line of sight of the user based on the tracking information, the location, and the direction in which the user is traveling. In addition, the device may further include means for identifying what the user is looking at based on the direction of the line of sight and the location of the user.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

In implementations described herein, a device may track its geographical location and a user's face, head, and/or eye via a camera. In addition, based its current location and the face/head/eye-tracking information, the device may determine a location (e.g., a building, a street, etc.) or a geographical feature (e.g., a lake, a mountain, etc.) at which the user looks. When the user provides a cue, the device may fetch information about the location/feature and/or conduct a transaction (e.g., reserve a seat in a restaurant) based on the information.

Figure 1:
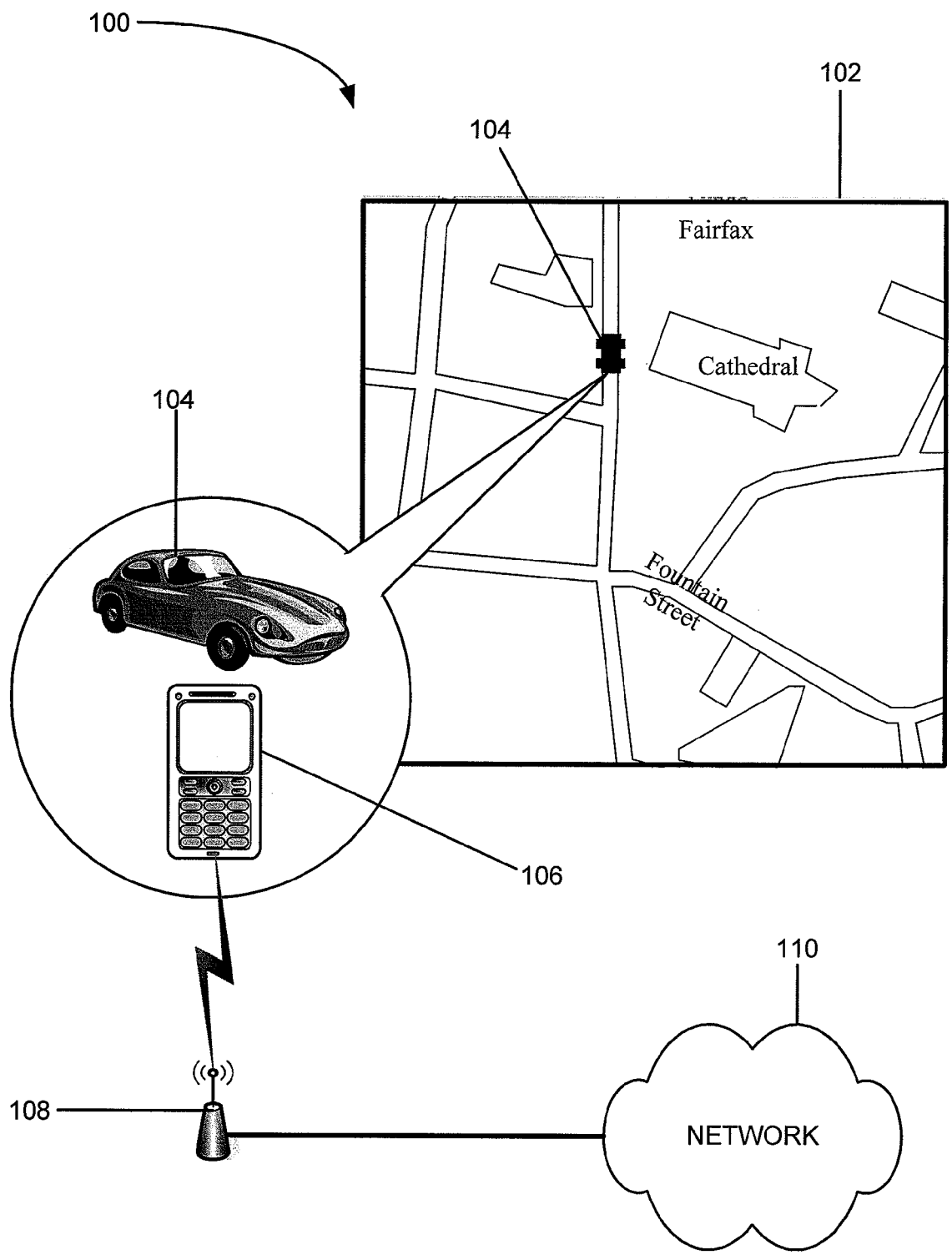
FIG. 1 shows an environment in which concepts described herein may be implemented.

FIG. 1 shows an exemplary environment in which concepts described herein may be implemented. As shown, environment 100 may include an area 102, a vehicle 104, a device 106, a wireless access point (WAP) 108, and a network 110. In other implementations, environment 100 may include more, fewer, or different components. For example, in one implementation, environment 100 may not include vehicle 104.

Area 102 may encompass a physical region that includes device 106 and one or more locations/features (e.g., a building, a street, a lake, etc.). Vehicle 104 may include a transportation vehicle (e.g., an airplane, a car, a boat, a ship, a helicopter, etc.).

Device 106 may include any of the following devices that have the ability to or are adapted to determine and/or display its geographical location: a telephone, such as a radio telephone or a mobile telephone with a positioning system (e.g., Global Positioning System (GPS), Beidou Navigation System (BNS), etc.); a personal communications system (PCS) terminal that may combine a cellular radiotelephone with GPS and/or BNS, data processing, facsimile, and/or data communications capabilities; an electronic notepad; a laptop; a personal computer (PC); a personal digital assistant (PDA) that can include a telephone; or another type of computational or communication device with the ability to determine and/or display its geographical location. In one implementation, device 106 may provide a map that shows the location of device 106 on a display. In some implementations, device 106 may be placed in vehicle 104, with its housing attached to a stable element within vehicle 104 (e.g., a dashboard) such that a camera in device 106 may be positioned to track the face, head, or an eye of a user (e.g., a driver or a passenger of vehicle 104).

WAP 108 may include a device for accessing network 110, such as a router that is able to receive and transmit wireless and/or wired signals, or any other device that provides access to a network. WAP 108 may communicate with device 106 using any wireless communication protocol.

Network 110 may include the Internet, an ad hoc network, a local area network (LAN), a wide area network (WAN), a metropolitan area network (MAN), a cellular network, a public switched telephone network (PSTN), an intranet, any other network, or combinations of networks.

In FIG. 1, device 106 may track its position and a user's face, head, and/or eye via a camera within device 106. Based on the current position of device 106 and the face/head/eye-tracking information, device 106 may determine the location/feature at which the user looks or focuses. When the user provides a cue (e.g., input), device 106 may fetch information about the location/feature and/or conduct a transaction (e.g., reserve a set in a restaurant) based on the information.

Exemplary Device

Figure 2:
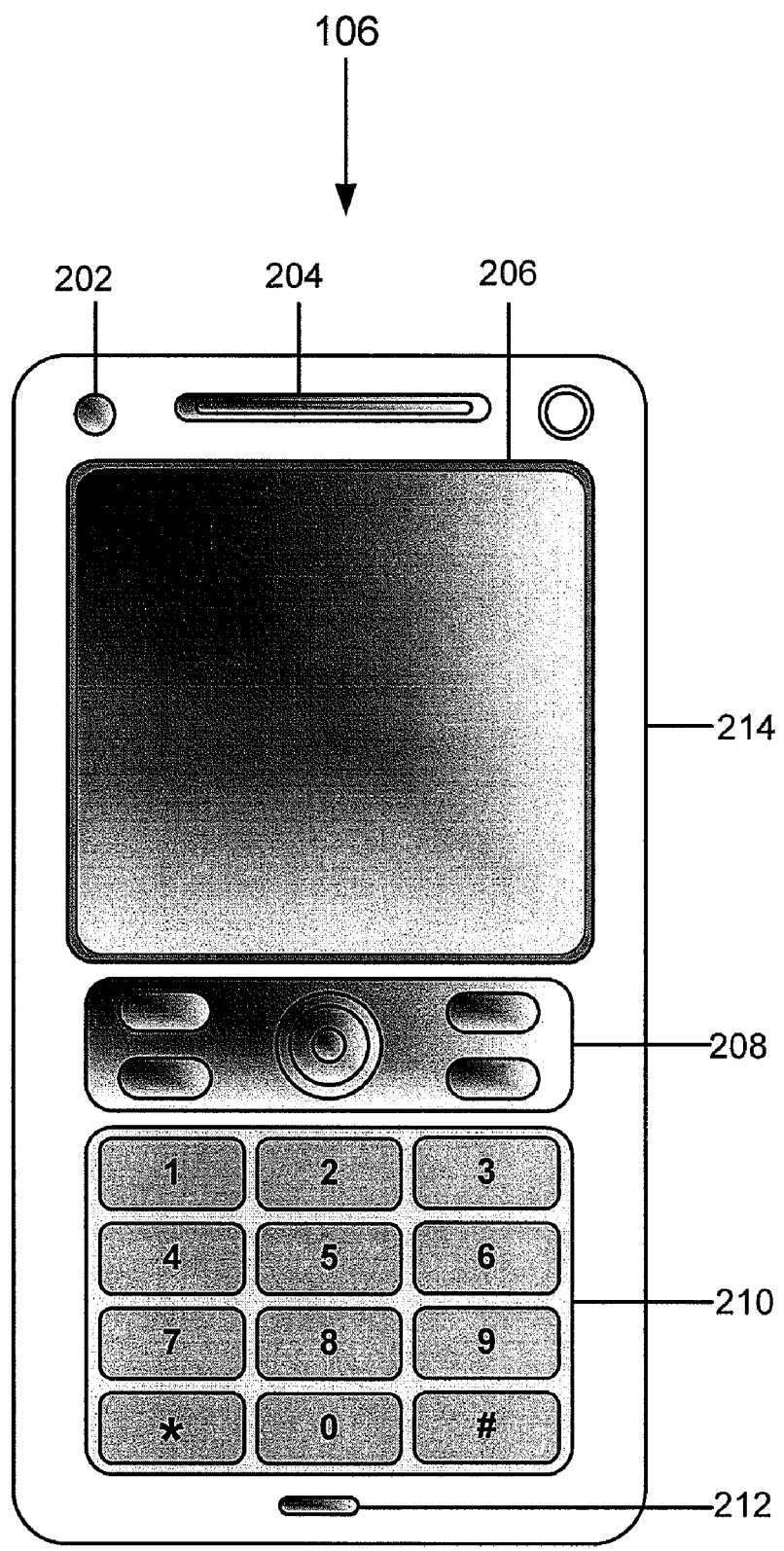
FIG. 2 is an exemplary diagram of a device of FIG. 1.

FIG. 2 is an exemplary block diagram of device 106. As illustrated, device 106 may include a camera 202, a speaker 204, a display 206, control buttons 208, a keypad 210, a microphone 212, and a housing 214. Camera 202 may enable a user to view, capture and store media (e.g., images, video clips) of a subject in front of device 106. Speaker 204 may provide audible information to a user of device 106. Display 206 may include a display screen to provide visual information to the user, such as video images or pictures, and may include a touch screen (e.g., a capacitive screen, near field screen) to accept input from a user. Control buttons 208 may permit the user to interact with device 106 to cause device 106 to perform one or more operations, such as place or receive a telephone call. Keypad 210 may include a standard telephone keypad. Microphone 212 may receive audible information from the user. Housing 214 may provide a casing for components of device 106 and may protect the components from outside elements.

Figure 3:
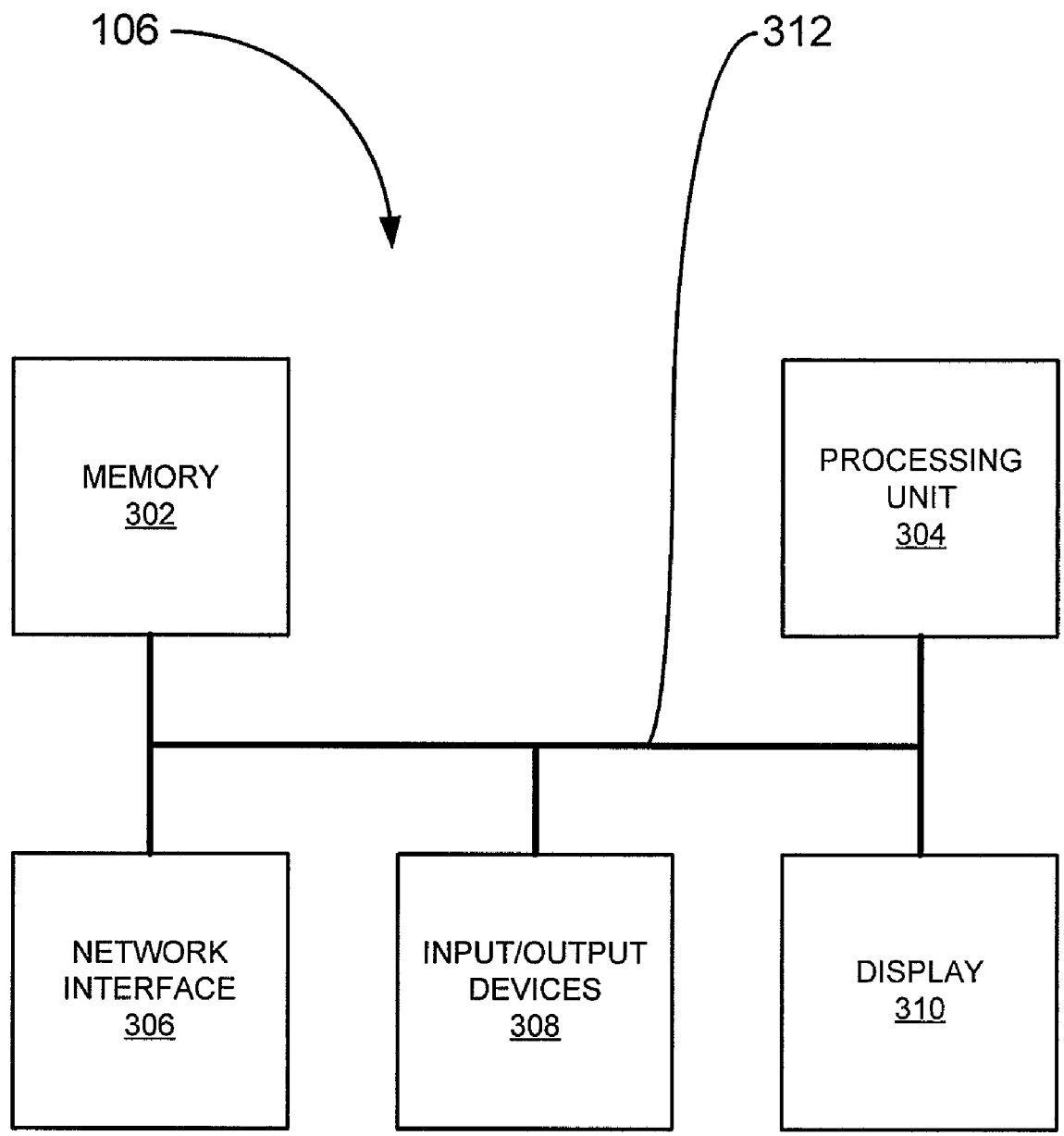
FIG. 3 is an exemplary block diagram of the device of FIG. 2.

FIG. 3 shows an exemplary block diagram of device 106 of FIG. 2. As shown, device 106 may include memory 302, processing unit 304, network interface 306, input/output devices 308, display 310, and bus 312. In other implementations, device 106 may include more, fewer, or different components. For example, device 106 may include a zoom lens assembly and/or auto-focus sensors.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include one or more processors, microprocessors, an Application Specific Integrated Circuit (ASIC), a Field Programmable Gate Array (FPGA), and/or other processing logic capable of controlling device 106.

Network interface 306 may include any transceiver-like mechanism that enables device 106 to communicate with other devices and/or systems. For example, network interface 306 may include mechanisms for communicating via a network, such as the Internet, a terrestrial wireless network (e.g., wireless local area network (WLAN)), a satellite-based network, etc. Additionally or alternatively, network interface 306 may include a modem, an Ethernet interface to a local area network (LAN), and/or an interface/connection for connecting device 106 to other devices (e.g., a Bluetooth interface). Further, network interface 306 may include one or more receivers, such as a Global Positioning System (GPS) or Beidou Navigation System (BNS) receiver for determining its own geographical location. Input/output devices 308 may include a camera (e.g., camera 202 of FIG. 2), a keyboard, a keypad (e.g., keypad 210 of FIG. 2), a button (e.g., control buttons 208), a mouse, a speaker (e.g., speaker 204), a microphone (e.g., microphone 212), a Digital Video Disk (DVD) writer, a DVD reader, Universal Serial Bus (USB) lines, and/or other types of devices for converting physical events or phenomena to and/or from digital signals that pertain to device 106.

Display 310 may include a device (e.g., display 206) that can display signals generated by device 106 as images on a screen (e.g., a liquid crystal display (LCD), cathode ray tube (CRT) display, organic light-emitting diode (OLED) display, surface-conduction electro-emitter display (SED), plasma display, field emission display (FED), bistable display, etc.) and a touch screen or a panel-enabled display that may function as a user input interface.

Bus 312 may provide an interface through which components of device 106 can communicate with one another.

Figure 4:
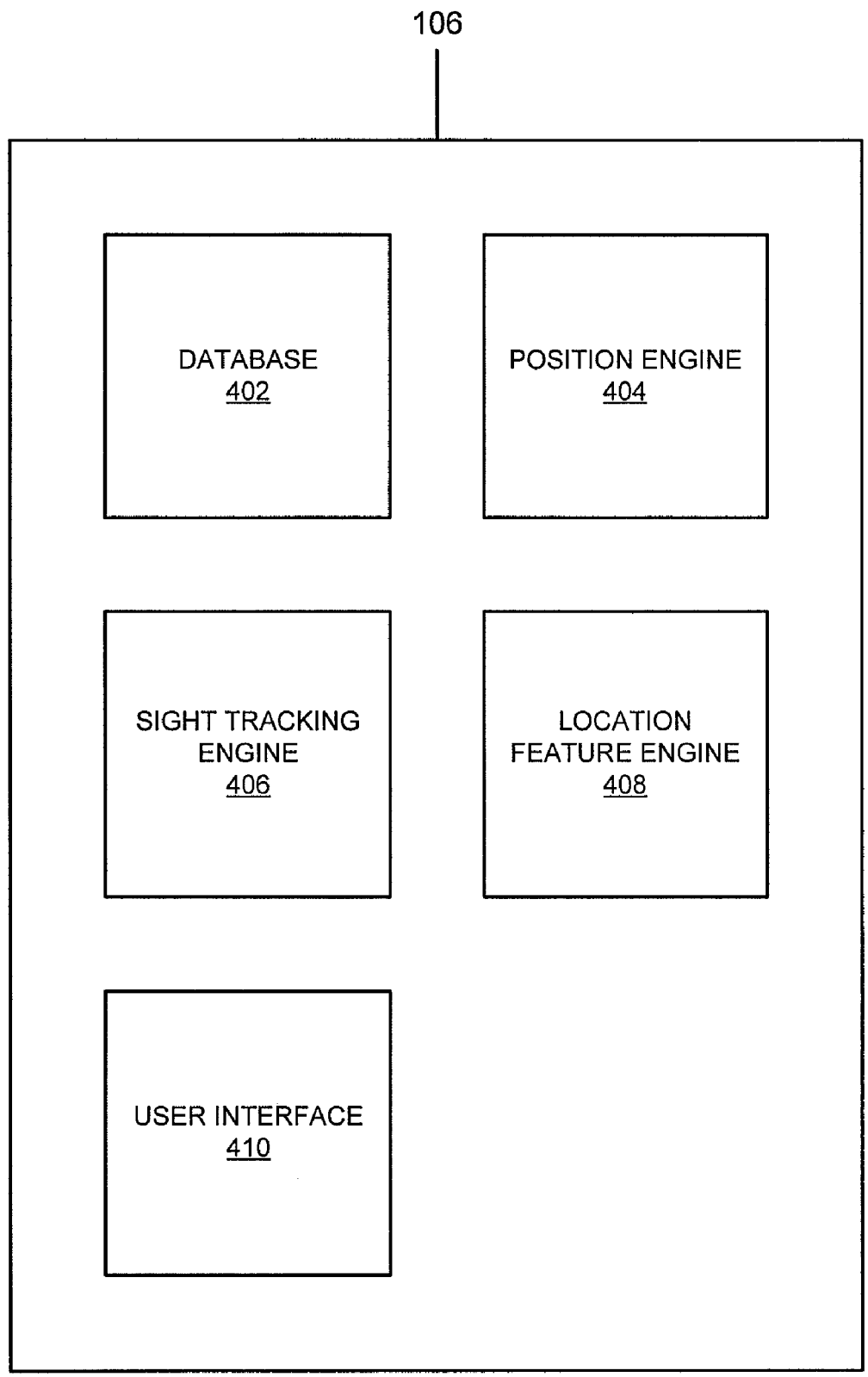
FIG. 4 is an exemplary functional block diagram of the device of FIG. 2.

FIG. 4 is an exemplary functional block diagram of device 106. As shown, device 106 may include a database 402, a position engine 404, a sight-tracking engine 406, a location feature engine 408, and a user interface 410. Depending on the particular implementation, device 106 may include fewer, additional, or different types of components than those illustrated in FIG. 4 (e.g., device 106 may include a web browser).

Database 402 may be included in memory 302 (FIG. 3) and act as an information repository for the components of device 106. For example, in one implementation, database 402 may include a map that may be used by device 106 to display the geographical location of device 106. In another example, position engine 404 may store and/or retrieve various images of user's face/head, in order to determine the orientation of the face or the head relative to a moving direction of device 106. Position engine 404 may include hardware and/or software for determining a geographical location and an orientation of device 106. In one implementation, position engine 404 may accept input from a GPS/BNS receiver within device 106 to determine both position and velocity of device 106. In this case, the velocity of device 106 in three dimensions may provide the direction of motion of device 106. The orientation of device 106 may be inferred based on an assumption that device 106 may face a direction opposite to that of its movement. In another implementation, position engine 404 may employ an inertial guidance system to determine a position and orientation of device 106. For example, a miniature accelerometer and gyroscope within device 106 may provide the position and orientation of device 106.

Sight-tracking engine 406 may include a face/head-tracking engine and/or an eye-tracking engine and may combine the outputs of the face/head-tracking engine and the eye-tracking engine to determine a direction of a user's sight in three dimensions, relative to a reference frame associated with sight-tracking engine 406.

The face/head-tracking engine may include hardware and/or software for accepting image inputs from camera 202 and, based on the images, for determining pitch, yaw, and roll of the user's head relative to the reference frame. In some implementations, in place of the pitch, yaw, and roll, Euler angles or other representations may be used to describe the orientation of the head.

Figure 5A:
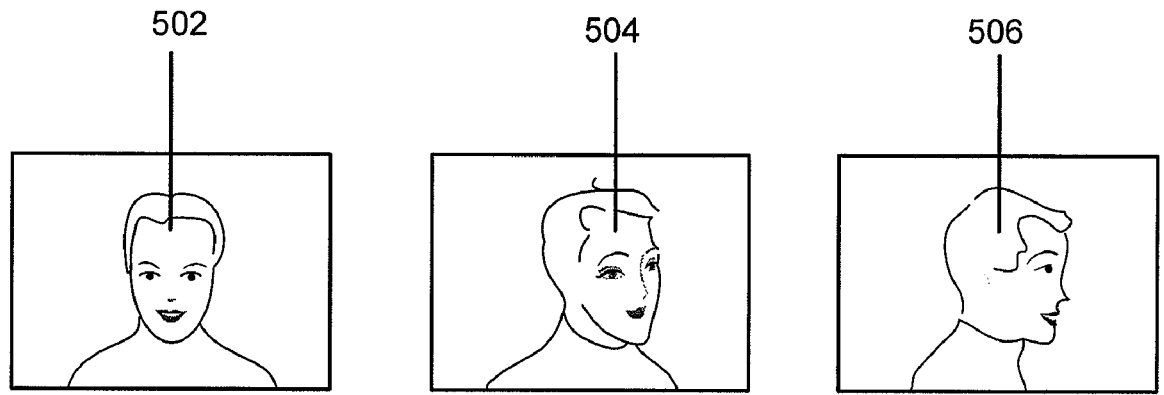
FIG. 5A shows different exemplary images that may be stored in a database of FIG. 4.

In one implementation, the face/head-tracking engine may compare images of the user's face/head to stored images to determine the pitch, yaw, and roll of the head relative to the reference frame. FIG. 5A shows different images that may be stored in database 402. Assuming that camera 202 is placed in front of the user's face, the images show the user's face in different orientations relative to camera 202. For example, image 502 shows the user's face when the pitch, yaw and roll of the head are (0 degrees, 0 degrees, 0 degrees) (e.g., the user looks in the direction of camera 202); image 504 shows the user's face when the pitch, yaw, and roll of the head are (0 degrees, −45 degrees, 0 degrees); and image 506 with the pitch, yaw, and roll of (0 degrees, −90 degrees, 0 degrees). Database 402 may include additional images of the face/head at other values of the pitch, yaw and roll. In some implementations, the images of the face/head may be captured by device 106 during a calibration or initialization phase associated with using device 106 to obtain information about locations/features. In other implementations, the images of a face/head at various orientations may be provided by a manufacturer of device 106 and/or a manufacturer associated with an application program used to track face/head/eye movement.

When the face/head-tracking engine receives an image of the user's face/head from camera 202, the face/head-tracking engine may compare the received image to images 502, 504, 506, and other images stored in database 402. Subsequently, the face/head-tracking engine may select an image that best matches the received image, and look up the angles associated with the matching image. For example, if image 504 best matches the received image, the face/head-tracking engine may determine the pitch, yaw, and roll as (0 degrees, −45 degrees, 0 degrees).

Figure 5B:
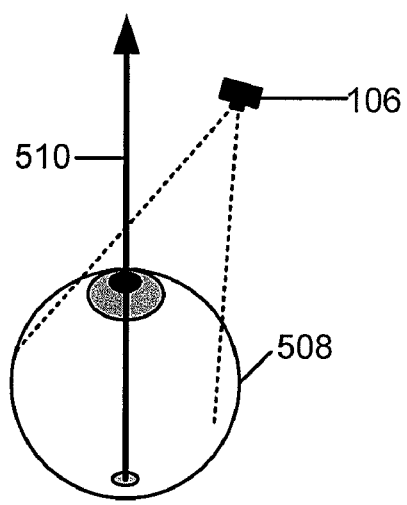
FIG. 5B illustrates exemplary eye-tracking.

The eye-tracking engine may include hardware and/or software for determining a direction of the user's line of sight (e.g., the direction in which the user looks) relative to the reference frame. FIG. 5B shows features that are associated with one implementation of the eye-tracking technique. In this case, the eye-tracking engine may accept inputs from camera 202 to determine movements of user's eyes and the angles of a line of sight 510 of a user's eye 508.

Returning to FIG. 4, location feature engine 408 may include hardware and/or software for determining a location/feature at which the user looks. Location feature engine 408 may use the position/direction information from position engine 404 and sight-tracking engine 406 to search a database of locations (e.g., buildings, roads, etc.) or geographical features (e.g., lakes, mountains, etc.) that may lie in the direction of the user's line of sight. In some implementations, location feature engine 408 may perform the search at device 106, assuming that database 402 includes records of relevant geographical information. In other implementations, location feature engine 408 may send the position/direction information to a remote server, which may perform the search and provide the results of the search to device 106. Even in cases where the user looks at building X located behind another shorter building Y, location feature engine 408 may be able to identify the building at which the user looks, provided that the database of locations/features include building heights. If the user does not focus on a location/feature within a particular threshold distance, location feature engine 408 may inform device 106 that there is no matching location/feature.

User interface 410 may include hardware and/or software for providing a user interface. Via user interface 410, the user may request information about a location/feature at which the user looks or focuses. For example, if the user looks at a building for more than a particular duration (e.g., 2 seconds), user interface 410 may trigger location feature engine 408 to identify the building and provide the identity to the user. In another implementation, the user may press a button coupled to device 106 or speak into a microphone 212 to indicate the user's interest in the building. A verbal instruction, such as "Get information," may be used as a cue for device 106 to retrieve the particular information.

In some implementations, user interface 410 may provide capabilities to conduct transactions based on the identification. For example, after providing the identity of a building to the user aurally via a headset coupled to device 106, user interface 410 may obtain a list of businesses that occupy the building via another database search and inform the user, "Building X's first floor is occupied by florist shop Z and restaurant W." In response, the user may request device 106, via user interface 410, to reserve seats at the restaurant on the user's behalf. To complete the transaction, user interface 410 may, for example, automatically credit or debit the user's account.

Exemplary Process for Obtaining Information by Tracking a User

Figure 6:
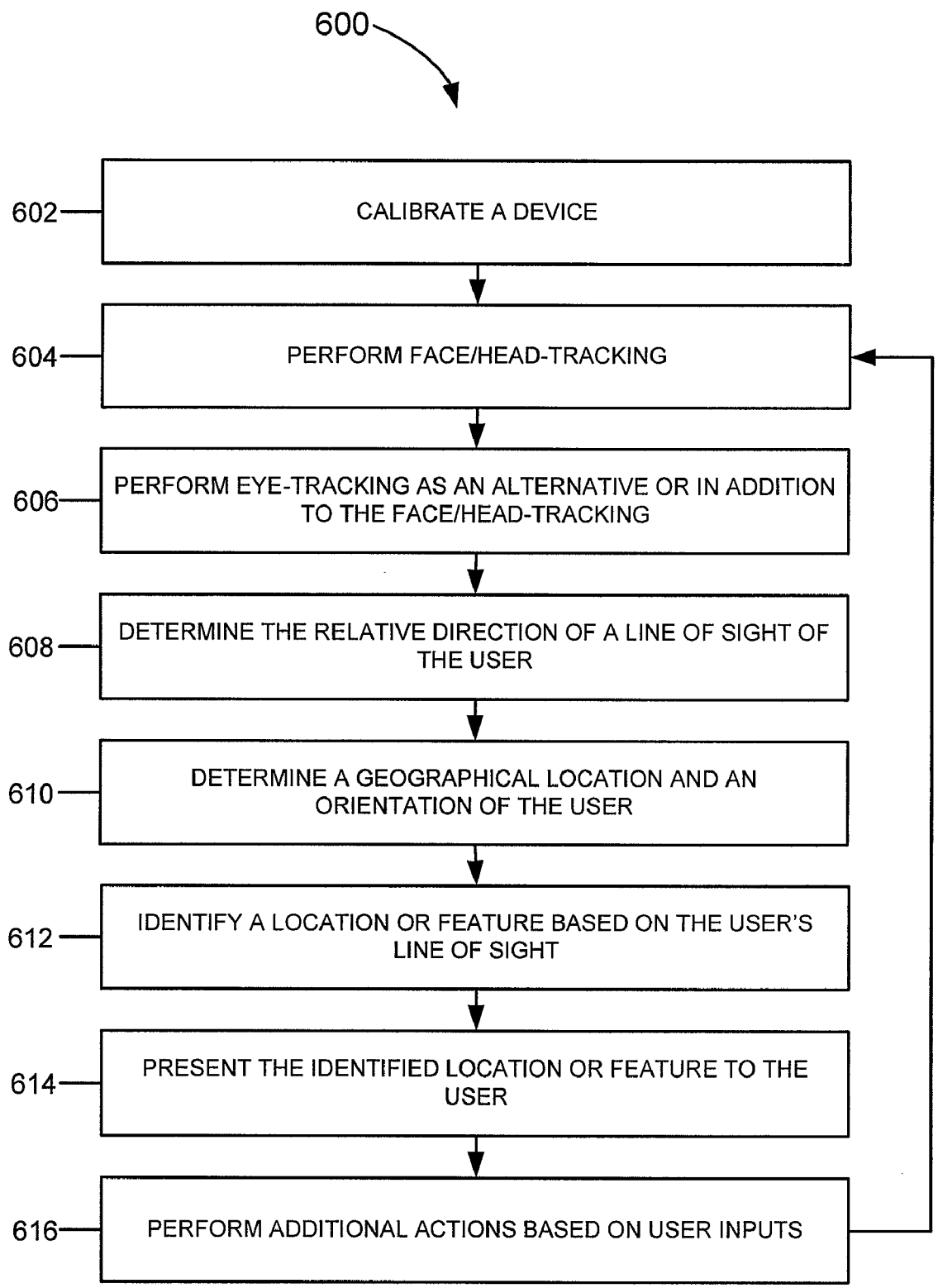
FIG. 6 is a flowchart of an exemplary process for obtaining information about a location or feature by face/head-tracking and/or eye-tracking.

FIG. 6 shows an exemplary process 600 for obtaining information about a location/feature based on face/head-tracking and/or eye-tracking. Process 600 may start at block 602, where device 106 may be calibrated. The calibration may include obtaining images of a user's face/head and associating each image with a set of angles (e.g., pitch, yaw, and roll). In some implementations, the calibration may not be needed, and block 602 may be omitted. For example, various images of a face/head may be pre-stored in device 106.

Face/head-tracking may be performed (block 604). The face/head-tracking may include continually taking an image of the user's face/head via camera 202 and comparing the image to images that are stored in database 402 at block 602. The result of each comparison may provide a best matching image and a set of angles that are associated with the best match.

Eye-tracking may be performed as an alternative or in addition to the face/head-tracking (block 606). The eye-tracking may include tracking a feature of an eye (e.g., pupil, reflections on cornea and/or lens of a user's eye, retina blood vessels, etc.), and obtaining the orientation of the eye. In some implementations, the eye-tracking may use the results of face/head-tracking to produce more accurate measurements.

A relative direction of a line of sight of the user may be determined (block 608). In some implementations, the results of the face/head-tracking or eye-tracking alone may provide the relative direction of the line of sight. In other implementations, the face/head tracking information may be combined with the eye-tracking information to determine the relative direction of the line of sight (e.g., relative to a direction in which device 106 moves).

A geographical location and an orientation of the user may be determined (block 610). In one implementation, the user's geographical location and the orientation may be determined based on the output of a GPS/BNS receiver within device 106, where the user is assumed to normally face the direction in which device 106 moves. In a different implementation, the user's orientation may be determined based on the orientation of device 106, assuming that the orientation of device 106 is constant relative to the user.

A location or feature may be identified based on the user's line of sight (block 612). In one implementation, to identify the location/feature, a list of locations/features may first be obtained from a database based on an area of interest (e.g., area 102 in FIG. 1). From the list, a set of locations/features that lie in the direction of the user's line of sight may be obtained. Obtaining the set may entail determining which locations/features in the list lie in the direction of the user's line of sight.

The overall direction of the user's line of sight may be determined based on the relative direction of the user's line of sight, determined at block 608, and on the user's orientation. For example, assume that a user is facing the north. If the direction of user's line of sight is (0 degrees, 30 degrees, 0 degrees) relative to the direction that the user faces (e.g., (0 degrees, 0 degrees, 0 degrees) relative to a longitude), the overall direction of user's line of sight may be determined as (0 degrees, 30 degrees, 0 degrees).

If multiple locations/features are found to lie in the overall direction of user's line of sight, size information related to the locations/features may be used to determine the particular feature at which the user is looking. For example, given the overall direction of the user's line of sight, if the user looks at building X that is located behind another building Y that is shorter than building X, the heights of buildings X and Y may be used to determine the building X as the focus of the user's sight. That is, if an angle associated with the user's face/head indicates that the user is looking upward, device 106 may determine that the user is looking at building x (i.e., the taller building).

In some instances, a location/feature that the user wishes to identify may not lie in the user's line of sight (e.g., a street). In those cases, the user may be given the option of identifying either the location/feature that is in the user's line of sight (e.g., a building) or other types of features (e.g., a street). The user may indicate which types of features are to be identified by device 106 via user interface 410.

The identified location or feature may be presented to the user (block 614). For example, the user may be presented with the identification aurally via a headset that is coupled to device 106 or via speaker 204. In another example, the user may view the identification on display 206 of device 106. If the user is also the driver of vehicle 104 and does not wish to look too far away from the road, the user may prefer to receive the identification information via the headset or speaker 204.

In some situations, device 106 may provide information that is alternative or in addition to the identification. For example, if a user looks at Jane's Café, device 106 may provide driving directions for the user, "To reach Jane's Café, take the second road on the right."

In some implementations, the identification and/or additional information may be conveyed to the user when the user provides a cue. For example, in one implementation, the user may signal the user's interest in obtaining the identification by pressing on a button of device 106 (e.g., one of control buttons 208). In another example, the user may use microphone 212 or a microphone on a headset that is coupled to device 106. Upon detecting the user's voice, device 106 may apply speech recognition techniques to recognize the user's command. For example, the user may utter, "building name," and device 106 may respond with the name of the building at which the user is looking.

Additional actions may be performed based on user inputs (block 616). Presented with the identification of a location/feature in which the user has interest, the user may issue additional commands to device 106. The commands may be provided via, for example, keypad 210, control buttons 208, microphone 212, etc. For example, assume that a user looks at a parking garage, and that device 106 relays the name of the garage through speaker 204, "24-Hour Parking House." The user may ask how many parking spaces are available, by asking, "number of parking spaces?" Device 106 may obtain the requested information via network 110 and present the desired information to the user through speaker 204, such as, "there are 12 parking spaces left."

In another example, the user may request the names of all businesses within a building that device 106 has identified. For example, the user may request, "list businesses in building X." Device 106 may answer, "Capitol Steak, Jane's Café, Office Supplies." The user may then issue another command, such as "Call Capitol Steak," or "Make reservation for 2, at 7:00 p.m. at Capitol Steak."

In some instances, the user may be prompted to provide an input. For example, after presenting the name of a store Z, device 106 may ask, "Would you like directions to store Z?" The user may input a response to device 106 via microphone 212, control buttons 208, etc.

In a different example, the user may conduct commercial transactions that are related to the identified location/feature. For example, suppose the user looks at a billboard that shows a picture of the musical group The Rolling Stones. Device 106 may ask the user, "Would you like to purchase album XYZ or download song ABC by the Rolling Stones?" When the user answers, "yes," device 106 may provide information to a server associated with selling XYZ or downloading ABC, and automatically complete a transaction to purchase album/song XYZ/ABC.

Example

Figure 7:
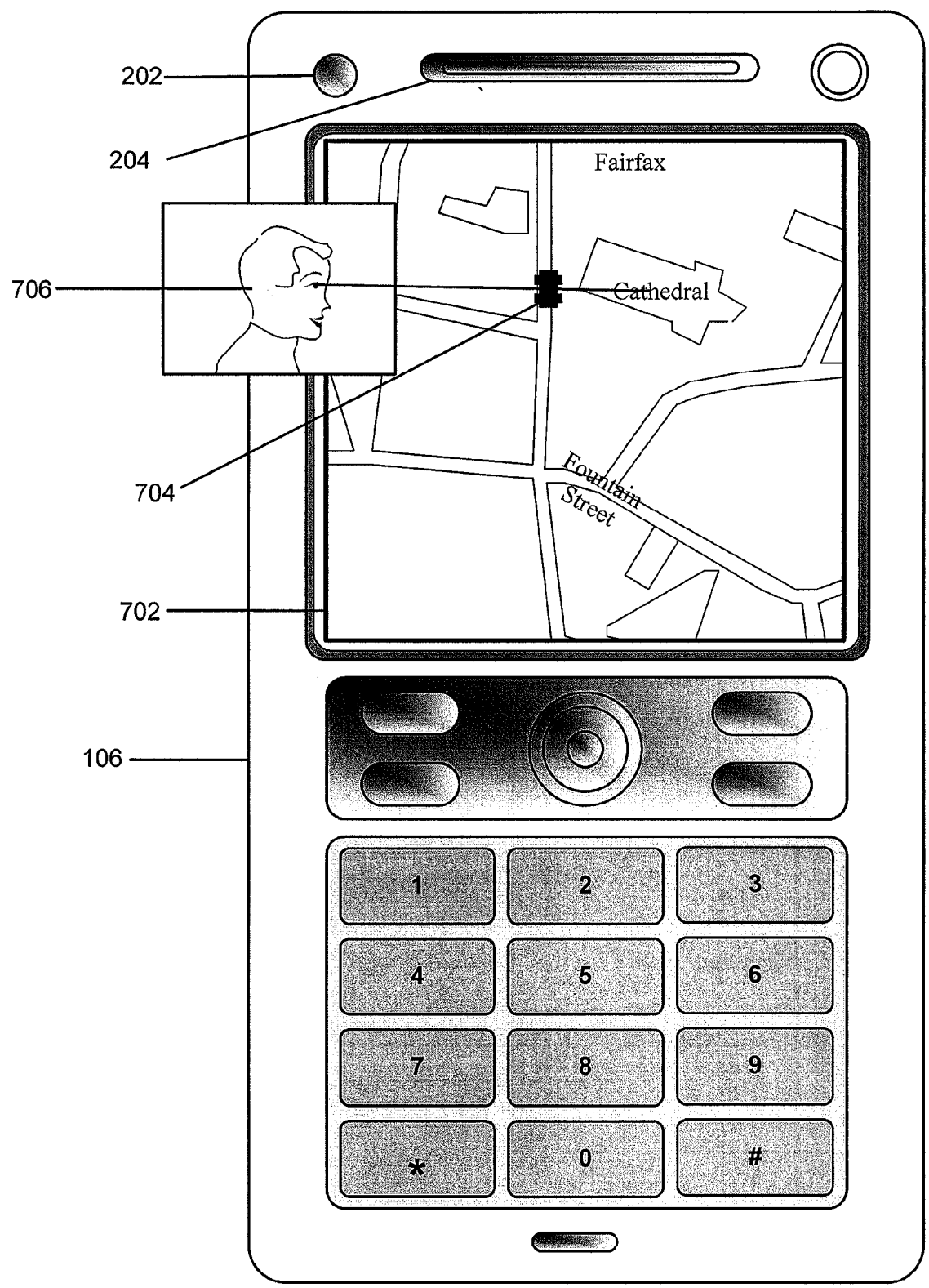
FIGS. 7, 8A, and 8B illustrate obtaining information about a location/feature based on face/head-tracking and/or eye-tracking.
Figure 8A:
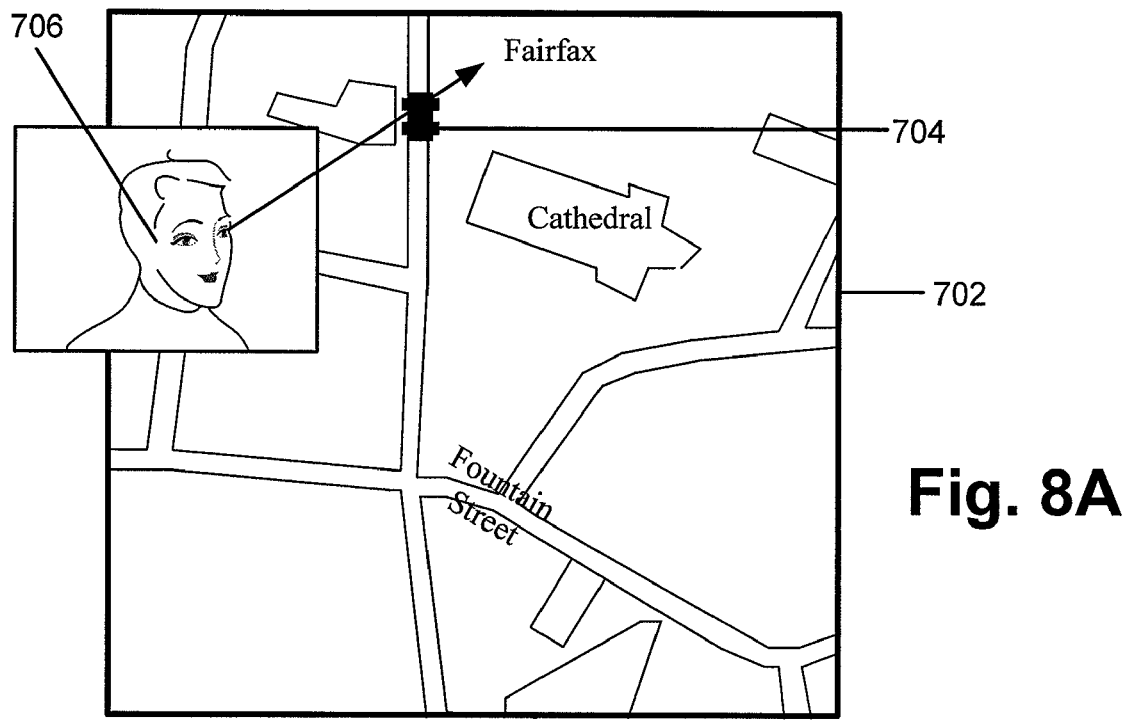
Figure 8B:
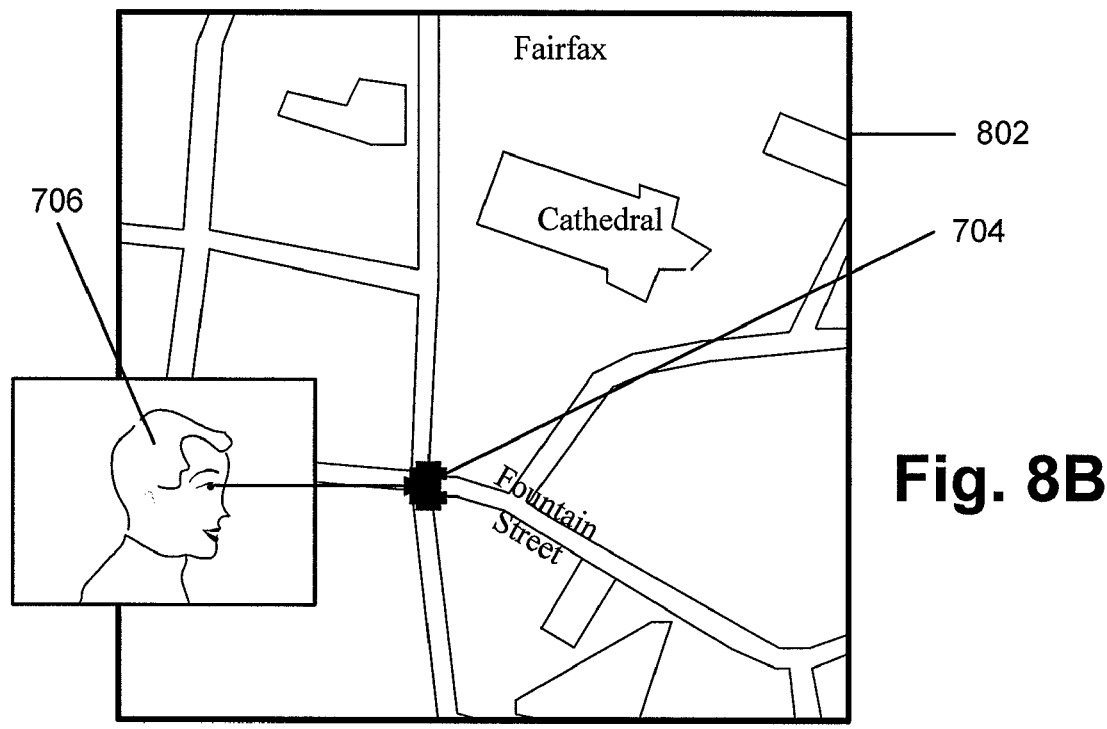

The following example illustrates processes involved in obtaining information about a location or feature based on face/head-tracking and/or eye-tracking, with reference to FIGS. 7, 8A, and 8B. The example is consistent with the exemplary process described above with reference to FIG. 6.

Assume that Bill has placed device 106 on the dashboard of a car, has inputted the address of his destination, University House, into device 106, and is driving the car. In addition, assume that device 106 is continually tracking a position and orientation of device 106 based on signals from the GPS/BNS satellites and an internal gyroscope. As illustrated in FIG. 7, device 106 displays a map 702 of the area within which Bill's car 704 is located. Camera 202 of device 106 tracks Bill's face, head, and/or eye.

When car 704 is at the position shown in FIG. 7, Bill turns his face 706, and looks straight at a building. In this implementation, device 106 tracks both his face and eye. Upon determining that Bill has locked his gaze or focused on the building for approximately for two seconds, device 106 determines the direction of Bill's line of sight, based on the outputs of sight-tracking engine 406 and the orientation of device 106. A search is performed at database 402 for a list of locations/features in map 702. From the list, device 106 selects a location/feature that is directly in Bill's overall line of sight. The identity of the building is conveyed to Bill via speaker 204. Devices 106 states, "Cathedral."

Bill loses his interest in the building, and turns his face 45 degrees from the direction in which car 704 travels. Bill looks at Fairfax and holds his line of sight for approximately two seconds. FIG. 8A shows the position of Bill's face, the direction of Bill's line of sight, and relative location of car 704 in map 702. By following the procedure described above with respect to Cathedral, device 106 determines that the location/feature at which Bill looks is Fairfax. Device 106 conveys the identity of the location/feature to Bill.

Bill continues to drive. When Bill is near a street, Bill turns to his right, as shown in FIG. 8B. Bill fixes his line of sight, and device 106 states, "Fountain Street." As further illustrated in FIG. 8B, Fountain Street is the name of the street in the direction of Bill's line of sight. When Bill utters "direction" to device 106, device 106 responds with, "Make a right turn, drive to the end of the block, and park." Having arrived at his destination, Bill makes a right turn and parks his car on a side of the street.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, in place of a single device that tracks a user's face or head, a separate network device, such as a web camera or a camera, may be used in conjunction with device 106. The networked device may relay information related to a tracked face (e.g., images) to device 106.

In another example, while a series of blocks has been described with regard to an exemplary process illustrated in FIG. 6, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   obtaining, by one or more devices of a mobile communication device, tracking information of a face or a head of a user of the mobile communication device;
   determining, by the one or more devices, a geographic location of the mobile communication device;
   determining, by the one or more devices, a position of the user with respect to the geographic location;
   determining, by the one or more devices, an orientation of the user with respect to the geographic location;
   determining, by the one or more devices, a direction of focus of the user, with respect to the geographic location, based on the tracking information, the position, and the orientation; and
   obtaining, by the one or more devices, information associated with a location or geographic feature identified in results of a search, using the direction of focus, of geographic information records related to the geographic location.

2. The method of claim 1, further comprising:
   presenting the obtained information to the user based on a user selection of at least one of:

a speaker of a headset coupled to the one or more devices; or a display of the one or more devices.

3. The method of claim 1, further comprising:

conducting, based on user input, a transaction related to the identified location or geographic feature based on the obtained information.

4. The method of claim 3, where conducting a transaction includes at least one of:

reserving a seat in a restaurant;

purchasing an item;

obtaining information about businesses associated with the identified location;

crediting or debiting an account of the user;

receiving instructions for traveling to the identified location; or receiving descriptions of the identified location.

5. The method of claim 1, wherein obtaining information associated with a location or a geographic feature includes:

transmitting, via a network, the tracking information, the position, and the orientation of the user to a network device; and obtaining the information from the results of the search of the geographic information records stored on a remote database associated with the network device.

6. The method of claim 1, wherein determining a geographic location includes:

receiving information from a global positioning system (GPS) receiver or a Beidou navigation system (BNS) receiver.

7. The method of claim 1, further comprising;

obtaining tracking information of an eye of the user.

8. The method of claim 7, where obtaining tracking information of an eye includes obtaining the tracking information of the eye based on at least one of:

a reflection on a cornea of the eye;

a reflection on a lens of the eye;

movements of a pupil of the eye; or images of a retina inside the eye.

9. The method of claim 7, wherein determining a direction of focus includes:

using the tracking information of the eye and the tracking information of the face or the head to determine that the direction of focus is maintained by the user for a particular amount of time.

10. The method claim 1, wherein obtaining information associated with a location or a geographic feature includes:

obtaining a list of places in an area associated with the identified location;

obtaining, from the list, a set of places that lie in the direction of focus; and using the direction of focus and height information of each place in the set, to determine a particular place, of the set of places on which the user focused.

11. The method of claim 1, wherein obtaining tracking information of a face includes:

capturing an image of the face or the head with a camera;

matching the captured image to a particular image of a plurality of stored images of the user's face or head; and identifying one or more angles that are associated with the particular image.

12. The method of claim 1, wherein obtaining tracking information includes:

obtaining tracking information via a camera associated with the mobile communication device and is stably mounted in a direction opposite to that of a moving vehicle in which the user is located.

13. The method of claim 1, wherein obtaining information associated with a location or a geographic feature includes at least one of:

retrieving, from the geographic information records, a name of a street that is within a particular threshold distance from the mobile communication device;

retrieving, from the geographic information records, a name of a landmark, a business, or a building that is within the particular threshold distance from the mobile communication device; or retrieving, from the geographic information records, information associated with operations related to the landmark, the business, or the building.

14. A mobile communication device comprising:

a camera for obtaining an image of a face or a head of a user; and a processor configured to:

determine a position of the mobile communication device;

obtain orientation information of the face or the head by comparing the image and a plurality of images that are associated with different angles of the face or the head;

determine a direction at which the user is looking based on the obtained orientation information and the position of the mobile communication device;

determine that the user is looking in the direction for a particular amount of time; and trigger, when the particular amount of time exceeds a threshold, an operation to obtain information associated with a location where the user is looking based on the direction and the position of the mobile communication device.

15. The mobile communication device of claim 14, wherein the processor is further configured to obtain the orientation information that corresponds to the different angles and includes:

a pitch, yaw, and roll; or

Euler angles.

16. The mobile communication device of claim 14, wherein the processor is further configured to determine whether the user is operating a vehicle, the mobile communication device further comprising:

a speaker for presenting the obtained information associated with the location to the user based on a determination that the user is operating a vehicle.

17. A device comprising:

means for obtaining tracking information of a face, a head, or eyes of a user;

means for determining a location and a direction in which the user is traveling;

means for determining a particular direction of a line of sight of the user based on the tracking information, the location, and the direction in which the user is traveling;

means for determining a duration of time that the user's line of sight is trained in the particular direction;

means for triggering an operation, when the duration of time exceeds a particular threshold, for identifying a geographic location or feature within a threshold distance associated with the line of sight of the user.

18. The method of claim 1, further comprising:

receiving, from the user, a request for particular information associated with the identified location or geographic feature; and providing, to the user and in response to the request, the requested information.

19. The method of claim 18, wherein receiving the request includes receiving a voice command from the user, and providing the requested information includes audibly providing the requested information based on the voice command.

20. The method of claim 1, further comprising:
determining whether the user is operating a vehicle; and
based on a determination that the user is operating a vehicle, audibly providing at least some of the obtained information to the user.

* * * * *